Sept. 12, 1933.   M. GOTTLIEB ET AL   1,926,805
FRAME LINE LEADER FILM
Filed June 16, 1932
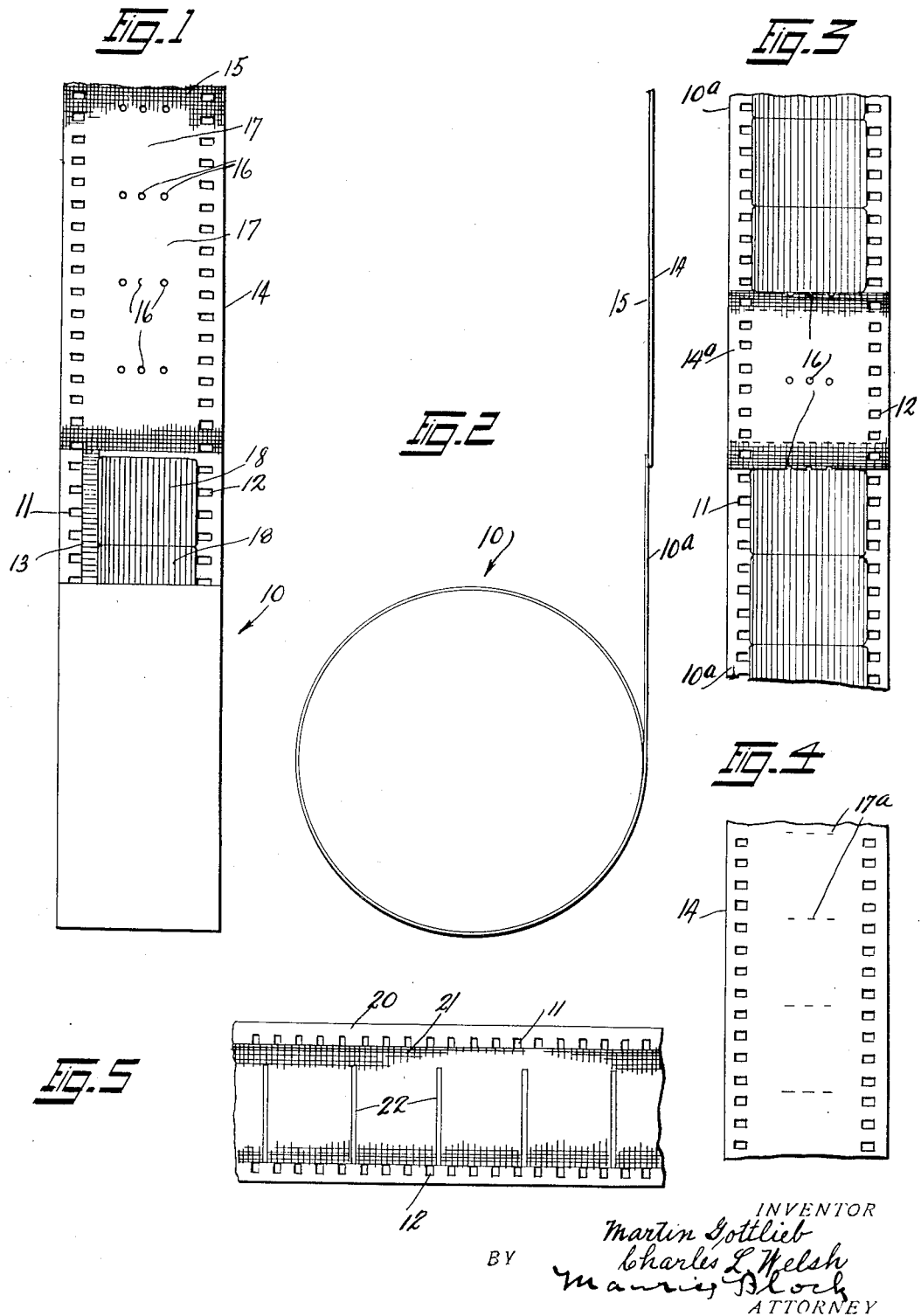

Patented Sept. 12, 1933

1,926,805

UNITED STATES PATENT OFFICE 1,926,805

FRAME-LINE LEADER FILM

Martin Gottlieb and Charles L. Welsh,
New York, N. Y.

Application June 16, 1932. Serial No. 617,521

2 Claims. (Cl. 88—16.2)

This invention relates to frame line leader film for motion pictures, and has for one of its objects the provision of a mechanically produced frame line leader made from light struck film, to supplant the relatively high priced photographically produced frame line leader now commonly used.

Another object of the invention is to produce a frame line leader which may be joined to a roll of film having a sound track without danger of producing what is known as motor boating when the film is projected upon the screen.

A further object of the invention is to produce a frame line leader provided with perforated, indented, or scored and broken frame lines, the said frame lines acting as a guide for cutting a section of the said frame line leader film to replace an equal section of main film which has been spoiled or is unfit for screening, thereby keeping the film in perfect synchronism with a sound record in cases where records are used.

At the present time photographically printed frame line leader film is used, which is very costly and where such a film is used in connection with a film having a sound track great care must be taken to properly secure the said leader film in order to avoid motor boating, as the frame lines thereon which are transparent extend from a point inwardly of one side edge of the central opaque area of the film to the extreme opposite edge thereof. By securing the frame line film with the said lines extending into the sound track area, the light from the projection lamp will pass through the said lines and cause motor boating.

It is therefore our object to provide a frame-line leader which is opaque over its entire area and provided with a centrally located frame line of the nature above referred to, which does not extend into the path of the sound track so that no matter which end thereof is pasted to the main film no motor boating is possible.

Other objects and advantages will appear as the nature of the improvements is better understood, the invention consisting substantially in the novel arrangement and co-relation of parts herein fully described, and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which Figure 1 is a front view of a roll of moving picture film provided with a section of our improved frame line leader.

Figure 2 is a side view thereof.

Figure 3 is a fragmental front view of a strip of film, spliced or joined together by a section of our improved frame line leader.

Figure 4 is a fragmental front view of a modified form of our invention and

Figure 5 is a fragmental front view of the present day frame line leader.

Referring now to the drawing in detail 10 indicates a roll of moving picture film 10a provided with the usual rows of sprocket teeth openings 11 and 12 near the side edges of the said film. In the present instance the said film is shown as provided with a sound track 13 to the right of the openings 11. A strip 14 of our improved frame line leader is shown secured to one end of the film 10a. This strip 14 of frame line leader is usually attached to the beginning of each reel of film by the motion picture operator in the booth, and is about fifteen feet in length, so that when the preceding reel which is being shown on the screen comes to about fifteen feet from the end, the succeeding reel which is in another projector is then threaded in frame, the machine is started and the said second reel will commence to show in proper frame on the screen just as the first reel ends. The said frame line leader is preferably made of light struck film which is exposed and then developed to produce a uniform opaque coating 15 over one entire surface thereof. After the said film has been developed, it is run through a machine and perforated as at 16 dividing the said frame line leader film into areas 17 equal in length to the photographed rectangular areas 18 of the main motion picture film.

It may be said here that instead of providing a multiplicity of perforations 16 a single perforation will suffice. Instead of perforating the film to produce the frame lines, they may be produced by short single or multiplicity of scorings or indentations or stamped lines 17a as shown in Figure 4. In this connection, we desire it understood that wherever in the claims "perforated" is used the term scored is to be included.

In Figure 3, we have illustrated a section 14a of our improved frame line leader film as employed to connect two sections 10a of the main film, the said section 14a being equal to the length of the section which has been cut away from the main film so as to keep the film perfectly synchronized with a sound record used in connection with the film.

In Figure 5, there is shown a section of the frame line leader 20 now commonly used. This leader is provided with an area 21 which is approximately the width of a sound track, and from the inner edge of which there extend a series of transparent frame markings or lines 22 which extend to about the inner edge of the sprockets wheel openings 12. The said transparent lines are photographically printed on the unexposed sensitized raw film stock which is costly, while in our improved frame line leader, the frame lines are perforated on film which has been spoiled due to having been light struck and which may be bought very cheaply. Furthermore, it will be seen that owing to the fact that the lines 22 are not centrally located with respect to the width of the film great care must be taken in securing the said frame line leader to a roll of motion picture film so that the area 21 is in line with the sound track 13 on the film.

From the foregoing, it will be seen that with the use of our improved frame line leader, the danger of motor boating is entirely eliminated, as it may be secured to the roll of film from either side thereof. It will further be seen that due to the fact that film which would otherwise have to be discarded, can be utilized to produce our improved frame line leader, the cost of production of same would be greatly less than the cost of the old or present day leader.

Having described our invention what we claim as new and desire to secure by Letters Patent is:

1. In combination with an exposed and developed motion picture film having frame lines and a sound track, a frame line leader attached to the film, comprising a length of film material having perforations constituting frame lines projecting to a point short of and in close proximity to an imaginary longitudinal line forming a continuation of the inside line of the sound track of the film.

2. A frame line leader, as claimed in claim 1, in which the frame line perforations comprise a plurality of small openings.

MARTIN GOTTLIEB.
CHARLES L. WELSH.